United States Patent
Graf et al.

(10) Patent No.: US 10,089,621 B2
(45) Date of Patent: Oct. 2, 2018

(54) DATA SUPPORT WITH TAN-GENERATOR AND DISPLAY

(75) Inventors: Hans Graf, Rosenheim (DE); Eike Thomas Bode, München (DE); Werner Strobl, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 2529 days.

(21) Appl. No.: 11/547,279

(22) PCT Filed: Apr. 5, 2005

(86) PCT No.: PCT/EP2005/003578
§ 371 (c)(1),
(2), (4) Date: May 23, 2007

(87) PCT Pub. No.: WO2005/098764
PCT Pub. Date: Oct. 20, 2005

(65) Prior Publication Data
US 2007/0277044 A1    Nov. 29, 2007

(30) Foreign Application Priority Data

Apr. 7, 2004 (DE) .......................... 10 2004 017 152
Feb. 23, 2005 (DE) .......................... 10 2005 008 258

(51) Int. Cl.
*G06Q 20/36* (2012.01)
*G07F 7/10* (2006.01)

(52) U.S. Cl.
CPC ....... *G06Q 20/3674* (2013.01); *G07F 7/1008* (2013.01)

(58) Field of Classification Search
CPC .................................................. G06Q 20/3674
USPC .......................................................... 705/64
See application file for complete search history.

(56) References Cited

U.S. PATENT DOCUMENTS

| 5,060,263 A | 10/1991 | Bosen et al. |
| 5,317,636 A | 5/1994 | Vizcaino |
| 5,937,068 A * | 8/1999 | Audebert ............. G06Q 20/341 |
| | | 235/382 |
| 6,067,621 A | 5/2000 | Yu et al. |

(Continued)

FOREIGN PATENT DOCUMENTS

| DE | 196 45 937 | 5/1998 |
| DE | 198 05-282 | 8/1999 |
| DE | 198 41 886 | 8/1999 |
| DE | 100 35 094 | 3/2002 |
| DE | 101 30 190 | 1/2003 |
| DE | 101 47 140 | 4/2003 |
| DE | 103 16 520 | 10/2004 |
| EP | 0 971 324 | 1/2000 |
| GB | 2 275 654 | 9/1994 |
| WO | WO 03/030396 | 4/2003 |

(Continued)

OTHER PUBLICATIONS

How Computers Work http://academic.safaribooksonline.com/book/hardware-and-gadgets/9780789736130/firstchapter#X2ludGVybmFsX0ZsYXNoUmVhZGVyP3htbGlkPTk3ODA3ODk3MzYxMzAvaWlp.*

(Continued)

*Primary Examiner* — Calvin L Hewitt, II
*Assistant Examiner* — Cristina Owen Sherr
(74) *Attorney, Agent, or Firm* — Workman Nydegger

(57) ABSTRACT

The invention creates a data carrier, in particular chip card, in particular smart card, having a device for generating one-time passwords and having a display for displaying generated one-time passwords. Preferably the data carrier is a Eurocheque card or credit card with the integrated function of an electronic purse (cash card function) and the generated one-time password is a transaction number (TAN) for acknowledging a secure electronic payment transaction.

20 Claims, 2 Drawing Sheets

(56) References Cited

U.S. PATENT DOCUMENTS

| | | | |
|---|---|---|---|
| 6,163,771 A * | 12/2000 | Walker | G06Q 20/04 |
| | | | 705/18 |
| 6,902,115 B2 | 6/2005 | Graf et al. | |
| 2001/0003445 A1 * | 6/2001 | Gauther | G06K 19/07 |
| | | | 345/87 |
| 2004/0133787 A1 | 7/2004 | Doughty et al. | |
| 2004/0263431 A1 | 12/2004 | Hohmann et al. | |
| 2005/0067485 A1 | 3/2005 | Caron | |
| 2005/0089029 A1 | 4/2005 | Ruhnke et al. | |
| 2005/0207081 A1 * | 9/2005 | Ying | H01H 9/32 |
| | | | 361/105 |
| 2005/0273626 A1 * | 12/2005 | Pearson | G06Q 20/32 |
| | | | 713/186 |
| 2008/0088614 A1 * | 4/2008 | Ozaki | G09G 3/3208 |
| | | | 345/205 |

FOREIGN PATENT DOCUMENTS

| | | |
|---|---|---|
| WO | WO 03/063099 | 7/2003 |
| WO | WO 03/084124 | 10/2003 |

OTHER PUBLICATIONS

White, Ron; How Computers Work, Copyright 1999 (Year: 1999).*
Examination Report received from German Patent and Trademark Office, App. No. 10 2005 008 258.0, dated Sep. 16, 2013.

* cited by examiner

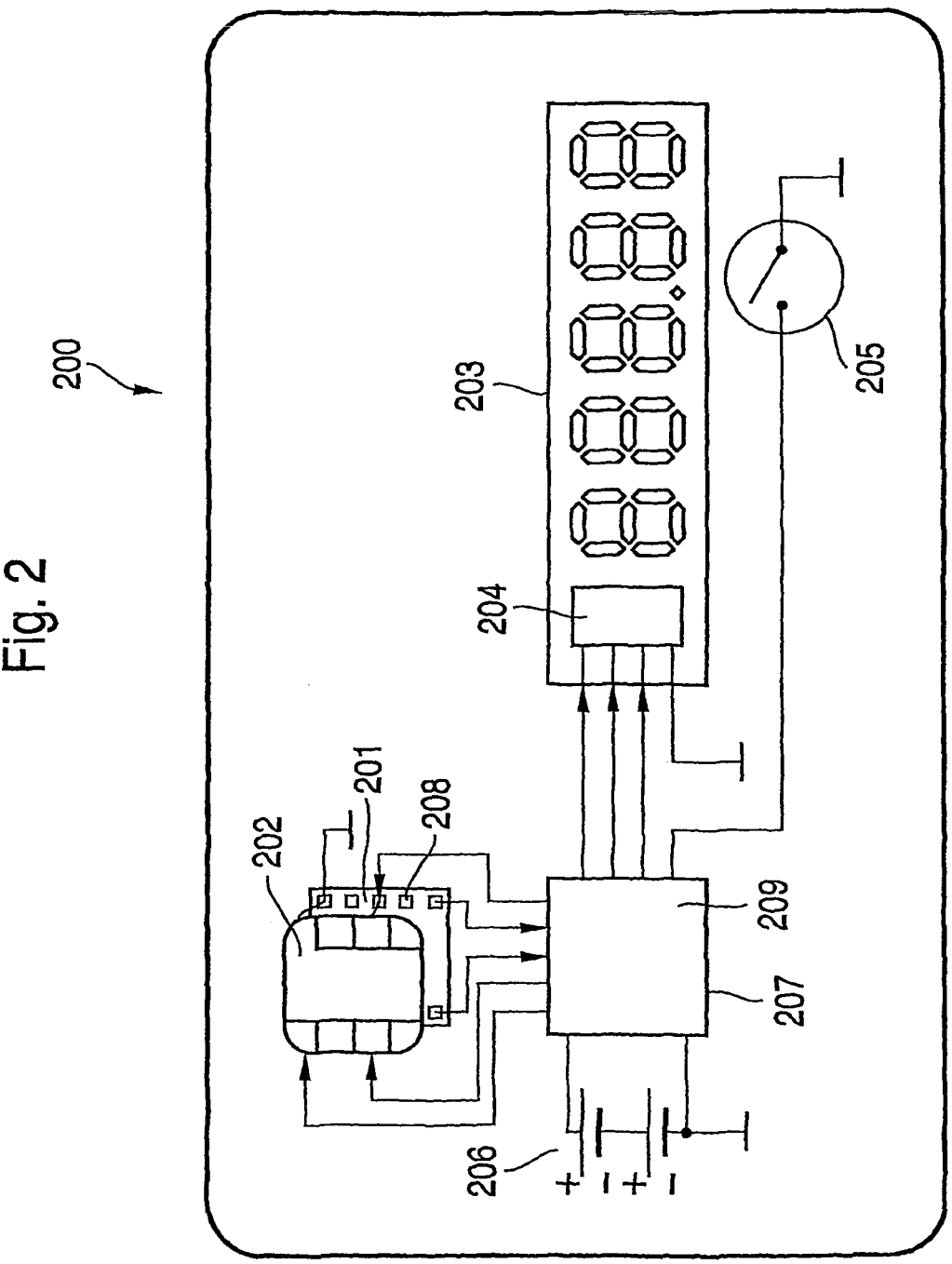

DATA SUPPORT WITH TAN-GENERATOR AND DISPLAY

FIELD OF THE INVENTION

The invention relates to a data carrier, in particular a chip card, in particular a smart card, having a device for generating one-time passwords.

BACKGROUND

A smart card means a chip card having a microprocessor or a smart card controller. Within this invention, in general, if a smart card has a plurality of microprocessors and/or controller circuits and/or logic circuits etc, the microprocessor etc, that makes the main functions of the smart card to be controllable, is referred to as microprocessor or smart card controller. Any microprocessors, controllers, logic circuits etc, by which the secondary functions of the smart card are controllable, are referred to as e.g. system controller or control logic.

From DE 198 41 886 C2 a method and a processor chip card for generating one-time passwords are known, as well as a method for the authentication of a user using a one-time password. For computing a first password, a randomly selected initial value is selected as plaintext to be encrypted, the initial value being encrypted with an encryption function $f_k$ and a key k. All subsequent one-time passwords are calculated by once more applying the encryption function $f_k$ to the preceding one-time password, i.e. the preceding one-time password serves as a plaintext for the next one-time password. As to be able to produce different one-time passwords and series of one-time passwords for different users, the encryption function $f_k$ is parameterized with the secret key k of the user of the processor chip card, which is used for the encryption. As to authenticate a user by the computer of an authenticating authority, the computer of the authenticating authority can determine the currently valid one-time password of each user and associate it to the user. The user transmits his currently valid one-time password to the computer of the authenticating authority, which compares the one-time password to the one-time password determined by the computer and authenticates the user only when the two one-time passwords match.

DE 198 41 886 C2 also describes the use of such a one-time password and authentication method in connection with a chip card, in particular a Eurocheque card having a chip in which the secret key k of the user is stored who is the holder of the Eurocheque card. An alternative use described in DE 198 41 886 C2 provides that as said chip card a chip card inserted in a mobile phone is used, the mobile phone being used as a reading device for the chip card.

In U.S. Pat. No. 6,067,621 a further apparatus and a further method for generating one-time passwords is described, as well as a method for the authentication of a user. There, a secret key for generating one-time passwords is stored on the IC card of a user. A portable terminal of the user reads the secret key out of the IC card, generates a random number and generates a one-time password using the read out secret key and the generated random number. The generated one-time password can be displayed on a display of the portable terminal. For generating a different one-time password in the terminal a different random number is generated and used. For authenticating the user, the user transmits the one-time password generated in his portable terminal to a server. The server likewise has the secret key and the random number of the user at its disposal, computes the one-time password itself, compares the self-computed one-time password to the one-time password obtained from the user and authenticates the user when the two one-time passwords match.

The apparatuses described in DE 198 41 886 C2 and U.S. Pat. No. 6,067,621 use a separate terminal having a display as a reading device for the chip card used when generating the password, as to display the generated one-time password. With the apparatus and method of U.S. Pat. No. 6,067,621, moreover, the terminal is necessary for computing the one-time password. With that the two known apparatuses have the disadvantage, that the terminal always has to be carried along. This makes the handling of the apparatuses complicated.

One-time passwords are used, for example, for secure electronic payment transactions, e.g. credit transfers, while home banking via Internet. The one-time password in this connection is referred to as transaction number (TAN). For carrying out a secure electronic payment transaction, e.g. an online credit transfer via Internet, the holder of a personal account, in particular bank account, initiates the payment transaction at a credit institution by e.g. making entries in an electronic credit transfer form, and electronically transmitting the electronic credit transfer form to the credit institution. In order to the payment transaction being executed, it has to be acknowledged with a transaction number (TAN). The transaction numbers (TANs) to be used usually are sent by post to the holder of the personal account (account holder) in the form of paper lists. The account holder electronically transmits a transaction number (TAN) from the list to the credit institution. With that the account holder acknowledges the payment transaction and thus effects that the payment transaction is executed. If the TAN list of an account holder comes into the hands of an unauthorized person, e.g. by the unauthorized person intercepting the list sent by post, and the unauthorized person gets knowledge of the access identification key for online banking (home banking), he can make payment transactions from the personal account of the account holder.

In the technical field of electronic purses it is already known to provide smart cards (microprocessor chip cards), the smart card controller (microprocessor) of which serves as a purse chip having the function of an electronic purse, with a display with the help of which the credit balance can be displayed in the purse chip. The problem with these smart cards having a display is that the electricity consumption of said smart card controllers is very high. But, however, it is necessary that the credit balance is displayed on the display so long that a user can read it off the display without problems.

DE 100 35 094 A1 describes a smart card having a smart card controller, a memory, a display, a system controller (display control logic, control logic) for the display, and an energy source (e.g. battery). The memory can be operated independent of the smart card controller with the help of the system controller (display control logic). The smart card controller is used as a purse chip of an electronic purse and contains an electronic credit balance, which via a terminal (chip card reading device) is reduced and increased by transactions. By a credit transfer transaction from a bank account to the purse chip, the credit balance of the purse chip is increased. By a credit transfer transaction from the purse chip to an external bank account or an external electronic money storage, the credit balance of the purse chip is reduced. The contacting between the chip card and the terminal is effected e.g. via contacts adapted for contact-type contacting. The smart card controller, which has a considerably higher electricity consumption than the system controller (display control logic) for the display, is supplied with energy via the external terminal. Since during the usage of the smart card controller, i.e. e.g. for increasing or reducing the credit balance in the purse chip, the terminal and the chip card are already connected to each other, it is no additional effort to supply the smart card controller with energy via the terminal. Whereas the system controller and the display are supplied with energy via the internal energy source of the smart card. Data from the smart card controller, for example the credit balance of the electronic purse, which are to be displayed on the display, are stored in the memory, as long as the smart card is connected with the terminal. Then the data can be displayed on the display using the internal energy source and with the aid of the display control logic, without a terminal being required for that.

A further smart card designed as an electronic purse and having a display for displaying the credit balance of the electronic purse is described in WO 03/030396 and DE 101 47 140 A1.

SUMMARY

It is the problem of the invention to create a data carrier especially easy to handle, in particular a chip card, in particular smart card, having a device for generating one-time passwords.

The problem is solved by a data carrier according to the independent apparatus claim and by a method according to one of the independent method claims or use claims. Advantageous embodiments of the invention are stated in the dependent claims.

The data carrier has a device for generating one-time passwords and, additionally, a display for displaying generated one-time passwords. With this data carrier thus a generated one-time password can be displayed directly on the data carrier without using any aids, e.g. a terminal or reading device.

A data carrier, which is very easy to handle, having a device for generating one-time passwords is created.

One method for operating the data carrier is a method for generating one-time passwords. Another use of the data carrier or the operating method is for acknowledging a secure electronic payment transaction. A further use is the authentication of the holder of a data carrier with the help of the data carrier or the operating method.

In the data carrier preferably at least one one-time password is stored.

Preferably, the data carrier is, in particular regarding its format, a flat chip card that has the additional advantage that its handling is especially easy, for example, because it can be carried in a purse like a common chip card. The chip card has a card body, which can be not-standardized or standardized, e.g. according to ISO 7810 ID-1 or ID-00 or ID-000.

The device for generating one-time passwords, for example, can be a microprocessor adapted for this purpose, in particular a TAN generator for generating transaction numbers (TANs) for secure electronic payment transactions. Optionally, further functions are implemented in the microprocessor.

Optionally, the microprocessor having functions of a smart card controller is designed such that the data carrier is a multifunctional smart card, in particular a Java-based multifunctional smart card, in particular a Java card.

The generated one-time password according to a preferred embodiment is a transaction number (TAN) for carrying out a secure electronic payment transaction via a personal account associated to a holder of the data carrier.

When using this preferred embodiment of the invention the holder generates a transaction number (TAN) with its data carrier, reads it off the display and inputs the read off transaction number in a transaction device for carrying out electronic payment transactions, for example in a transaction terminal at a credit institution (bank, savings bank), or when home banking in the own computer and from there via Internet to a transaction server of a credit institution.

Preferably, the data carrier has the further function of a payment transaction card, e.g. a Eurocheque card or a credit card, in which are implemented pieces of information regarding a personal account associated to a holder of the data carrier and/or functionalities for carrying out secure electronic payment transactions via the personal account.

This embodiment further has the advantage, that for generating the one-time password a data carrier is used, which the holder of the data carrier already carries with him, namely his Eurocheque card or credit card or other similar payment transaction cards.

Especially preferred is this embodiment in connection with the generated one-time password being a transaction number (TAN) for carrying out a secure electronic payment transaction via a personal account associated to a holder of the data carrier. In this case the holder of a personal account, for example a current account at a credit institution, and of a payment transaction card (Eurocheque card or credit card etc.) associated to the personal account starts a transaction with his payment transaction card in the usual fashion. When home banking at his computer the account and card holder starts the transaction, for example, by respective inputs via a data entry form on the monitor of the computer. The transaction then has to be acknowledged by the account and card holder and is thereby released for execution. According to the preferred embodiment of the invention the holder generates the transaction number TAN with the same payment transaction card he started the transaction, reads the transaction number TAN off the display of the payment transaction card and inputs the TAN in his computer. A complicated, expensive and insecure mailing of the transaction numbers (TANs) by post is not required. Consequently, the data carrier according to the preferred embodiment is especially easy to handle and in addition especially secure.

Optionally, the data carrier, alternatively or additionally, has the function of an electronic purse (CASH CARD). In this case, preferably, the display is (also) adapted for displaying the information of the electronic purse, in particular for displaying the current credit balance of the electronic purse. This means the display permits both displaying a generated one-time password and displaying the credit balance or other information of the electronic purse.

According to a further preferred embodiment the data carrier in addition has a display control logic designed for actuating the display, e.g. a per se known display driver. Further preferably, the display control logic is operable independently of the device for generating one-time passwords, as a result of which there can be achieved, in particular, that for displaying a generated one-time password on the display the device for generating one-time passwords can be out of operation. This is advantageous especially when, as further preferred, the display control logic has a considerably lower power consumption (energy consumption per time) or electricity consumption than the device for generating one-time passwords. In this case, the device for generating one-time passwords, which has a higher electricity consumption, needs to be in operation only during the actual generation of a one-time password. For displaying the generated one-time password only the power-saving control logic needs to be in operation.

Typically, in addition the time needed for generating a one-time password, which lies in the microsecond range, is considerably shorter than the period needed for reading off the display which lies in the range of some seconds. Therefore, the quantity of energy that can be saved by the device used for generating a one-time password, e.g. a microprocessor, being in operation only when actually generating the one-time password, and by using a power-saving and energy-saving display control logic (e.g. display driver) for displaying the generated one-time password, is considerable.

According to a preferred embodiment the data carrier having the additional display control logic further has a display memory, that can be connected between the device for generating one-time passwords and the display control logic, and in which can be stored one-time passwords generated for the purpose of being displayed on the display, so that with the help of the display control logic they can be displayed directly from the display memory onto the display. As soon as a generated one-time password has been loaded from the device for generating one-time passwords into the display memory, the device for generating one-time passwords (e.g. microprocessor) can be put out of operation.

Optionally, the display memory, like the display control logic, can be operated in a power-saving and/or energy-saving mode.

Optionally, the display memory is a volatile memory, which has a hold time that is long enough so that a one-time password displayed on the display can be read off the display. Such a volatile display memory has the advantage, that the display of a TAN displayed on the display fades away by itself, favorably, after a user has completely read off the TAN. Thereby can be prevented an unauthorized person reading the TAN once again later. For example the hold time is at least one second, further preferably at least three seconds, further preferably at least five seconds. Optionally, the maximum hold time is five seconds, alternatively, ten seconds, alternatively, thirty seconds, alternatively, one minute.

Optionally, the display and the display memory are separated elements.

Optionally, alternatively, the display itself at the same time is the display memory, in particular, if the display memory is a volatile memory with a predetermined hold time, e.g. a hold time like that described in the preceding paragraph. For example, the combined display memory/display is a bistable display, which after its separation from the supply power during the hold time for a certain time displays the value displayed last before the separation from the supply voltage. The hold time of the bistable display is set by parameters such as, for example, the chemical and/or geometric nature of the bistable display. The value of the hold time for such a bistable display, depending on the choice of parameters, can range between about a second and up to a plurality of months. In connection with this invention the parameters, in particular the chemical and/or geometric nature of the bistable display, preferably are chosen such that a hold time like the above-described is achieved (e.g. typically five seconds).

Optionally, the display memory is a volatile memory (e.g. a RAM), which can be operated in a retention mode (in particular RAM retention mode), during which the display memory can hold its memory content while the current supply is low. For a display memory having the form of a typical RAM an electric current is required for holding the memory content of the display memory in the RAM retention mode that amounts to about 0.1 $\mu A$. Such a current can be provided by a battery suitable for being inserted in a data carrier (e.g. smart card, chip card). Optionally, the display memory is a non-volatile memory, which holds its memory content without energy being supplied from outside, e.g. an EEPROM. Using a non-volatile display memory or a volatile memory with retention mode has the advantage that a user can read the generated one-time password without hurry, so that reading errors on reading the one-time password are prevented. If the read off one-time password then is really used, there will be no danger of misuse, since the one-time password can only be used once, and if it should be used once again, it will be rejected as invalid.

As to the spatial arrangement the display control logic, the device for generating one-time passwords (e.g. microprocessor) and, if any, the display memory can be implemented on different chips, in particular semiconductor chips. Alternatively, dependent on the demand, some or all of the mentioned elements, namely display control logic, device for generating one-time passwords (e.g. microprocessor) and if any, display memory are implemented in one single common chip.

Preferably, the data carrier further has a switching device for temporarily and/or permanently electrically connecting the device for generating a one-time password and/or, if any, of the display memory to an energy source.

According to a preferred embodiment the data carrier further has an energy source, in particular at least one battery and/or solar cell and/or piezoelectric element, so that the data carrier can be operated autonomously, without a terminal or reading device or reading/writing device being involved. In particular it is of advantage for the data carrier according to this embodiment of the invention, when for generating, displaying and reading a one-time password, as well as for supplying energy to the data carrier, an aid is not necessary. Therefore, in this embodiment the energy source provided within the data carrier is also used for supplying energy to the device for generating one-time passwords (e.g. microprocessor, TAN generator). Unlike the prior art electronic purse with display, wherein during the use of the purse chip the purse chip in any case is connected to a terminal via a contact-type interface, so that the purse chip can also be supplied with energy by the terminal without any additional effort, the data carrier according to the invention having a device for generating one-time passwords in this embodiment usually is not connected to an external terminal when generating a one-time password. Therefore, with this embodiment of the invention it is advantageous, when during the entire process of generating, displaying and reading of a one-time password an external energy source is not required, but instead the internal energy source of the data carrier is used.

In a further embodiment of the invention, during the generation the one-time password the data carrier is partially or completely, preferably completely, supplied with energy from an energy source located outside the data carrier, for example with energy from an energy source located in a terminal for the data carrier. The energy transmission from the terminal to the data carrier can be effected, selectively, either contactless or in a contact-type fashion.

In a further embodiment of the invention, which can also be combined with the last described embodiment, during the display of the one-time password on the display the data carrier partially or completely, preferably completely, is supplied with energy from an energy source located within the data carrier.

According to further preferred embodiments during the generation of the one-time password the device for generating one-time passwords is supplied with energy from an energy source located outside the data carrier. This has the advantage, that outside the data carrier normally a powerful energy source can be accommodated without any problems, what is not necessarily the case within the data carrier. In addition, an internal energy source optionally disposed in the data carrier is not subject to the loads caused by the electricity- and voltage-intensive device for generating one-time passwords, or the data carrier is operable with a less powerful energy source. Further preferably, during the display of the one-time password on the display, a display control logic for actuating the display separated from the device for generating one-time passwords is supplied with energy from an energy source located within the data carrier. Such a display of the one-time password can be effected independently of an access to an external energy source, for example an energy source in a terminal, and therefore is especially comfortable.

According to a further embodiment of the invention a plurality of at least two one-time passwords is generated and stored in the data carrier, without in between the generation of the said individual one-time passwords one of these one-time passwords being displayed on the display.

Optionally, a plurality of one-time passwords is generated using an external energy source, while the data carrier is connected to the external energy source.

The external energy source e.g. can be the energy source of a terminal for data carriers, for example a payment transaction terminal. Later, for example when home banking at the own PC, the one-time passwords generated beforehand can be displayed on the display, for the purpose of which for example an internal energy source is used, which is provided in the data carrier. With this variant one energy source within the data carrier is sufficient, which supplies a relatively low voltage that is sufficient for displaying the one-time password on the display, but, however, will possibly not be sufficient for generating one-time passwords.

Widespread batteries are batteries supplying a voltage of about 2.7 volt. If the internal energy source of the data carrier is only required for displaying a one-time password on the display, for example one of such 2.7-volt-batteries is provided in the data carrier. If the internal energy source of the data carrier, however, is required for generating a one-time password with a usual device for generating one-time passwords, e.g. a TAN generator in the form of a microcontroller or microprocessor, which usually needs a supply voltage of 5 volt, two of such 2.7-volt-batteries are provided in the data carrier, which in an interconnected fashion are able to supply the required 5 volt. Instead of providing two 2.7-volt-batteries, alternatively, there can be provided one single battery with e.g. 2.7-volt-voltage or another voltage under the operating voltage required by the microprocessor of e.g. 5 volt, which is combined with a downstream charge pump, so that the required e.g. 5 volt are generated. For microcontrollers or microprocessors, which are operable with lower operating voltages, respective batteries or battery arrangements having lower voltages, e.g. one 2.7-volt-battery without voltage adjustment, are sufficient.

The number of one-time passwords, which are generated and stored beforehand, without a single one-time password being displayed on the display in between the generation and storage of the one-time passwords, optionally has a predetermined value, which for example typically can be 250, alternatively typically 1000 or several thousands. Alternatively, a number of only typically 10 one-time passwords can be generated and stored, which has the advantage that in the case of loss of the data carrier only a small number of one-time passwords generated beforehand may come into the hands of a possibly successful hacker. Optionally, the number of passwords is filled up each time the data carrier is connected to an external energy source, e.g. on each contact with a terminal, as to reach the predetermined value, in case one-time passwords have been used since the last contact.

The switching device preferably is adapted to effect that the device for generating one-time passwords during the generation of a one-time password is supplied with energy from the energy source. The switching device preferably further is adapted in such a way that the supply for the device for generating one-time passwords with energy of the energy source is interrupted, as soon as the one-time password is generated and saved for being displayed on the display, since with this mode of functioning for the switching device an especially power-saving operation of the data carrier is possible. The one-time password is saved for being displayed on the display, for example, as soon as it is stored in the display memory.

Further preferably, the switching device is adapted such that during the display of the one-time password on the display, the display control logic and, optionally as required, the display memory is supplied with energy of the energy source.

Preferably, the switching device controls the entire energy supply of the data carrier during the entire process of generating a one-time password with the device for generating one-time passwords and the subsequent display of the generated one-time password on the display. According to the above-described preferred embodiments only those elements of the data carrier are supplied with energy, which at the respective point of time need energy. This is especially advantageous with a data carrier having an own internal energy source that is used for supplying the display control logic and the device for generating one-time passwords and, optionally, the display memory with energy.

Further, the switching device preferably can be actuated with the help of a manually actuatable energy operating unit, in particular a keyboard with at least one key or a push button or touch contact switch. For example, by pushing the energy operating unit one time, for example a touch contact switch, a one-time password is generated and displayed on the display. In the meantime, the energy supply within the data carrier is controlled in an efficient fashion as described above. The energy operating unit in particular can be provided with any type of switch, e.g. mechanical switch, piezo switch, relay etc.

According to a variant "at the touch of a button", i.e. by actuating the energy operating unit, in any case a one-time password is immediately generated. The data carrier according to this variant is especially comfortable to handle.

According to an alternative variant the data carrier further has an access check device, which permits the operation of the data carrier for generating a one-time password only when a successful input of a predetermined access identification key (e.g. personal identification number, PIN) has been effected. The data carrier according to this variant offers a higher degree of security than the data carrier without access control by access identification key (PIN).

Instead of a PIN, alternatively, there can be provided that as an access identification key in order to permit the operation of the data carrier, a biometric feature must be entered, for example one or a plurality of finger prints, an eye iris feature, a face feature such as e.g. face form etc. Accordingly, the data carrier optionally has a biometric detection device such as e.g. a finger print sensor for detecting finger prints or/and a camera for capturing the eye iris or the face form or other face features of a person who wishes to access the data carrier.

Further preferably, the data carrier having access control via the access identification key has an access operating unit for operating the access check device, in particular a keyboard with at least one key or a push button or touch contact switch.

The access operating unit can be, for example, a ten-key keyboard, a keypad with two keys or one single key.

Optionally, the energy operating unit, via which the energy supply and the generation of one-time passwords are triggered, and the access operating unit, via which the access identification key can be entered, are formed by one common universal operating element, which depending on the type of operation permits the input of the access identification key or triggers the generation of a one-time password. The common universal operating element, for example, can be formed by a single touch contact switch.

BRIEF DESCRIPTION OF THE DRAWINGS

In the following, the invention is explained in more detail with reference to embodiments and to the Figures.

FIG. 2 shows a schematic representation of a data carrier according to the invention designed as Eurocheque card with cash card function having a device for generating one-time passwords and having a display for displaying a generated one-time password.

DETAILED DESCRIPTION OF THE PREFERRED EMBODIMENTS

Figure 1:
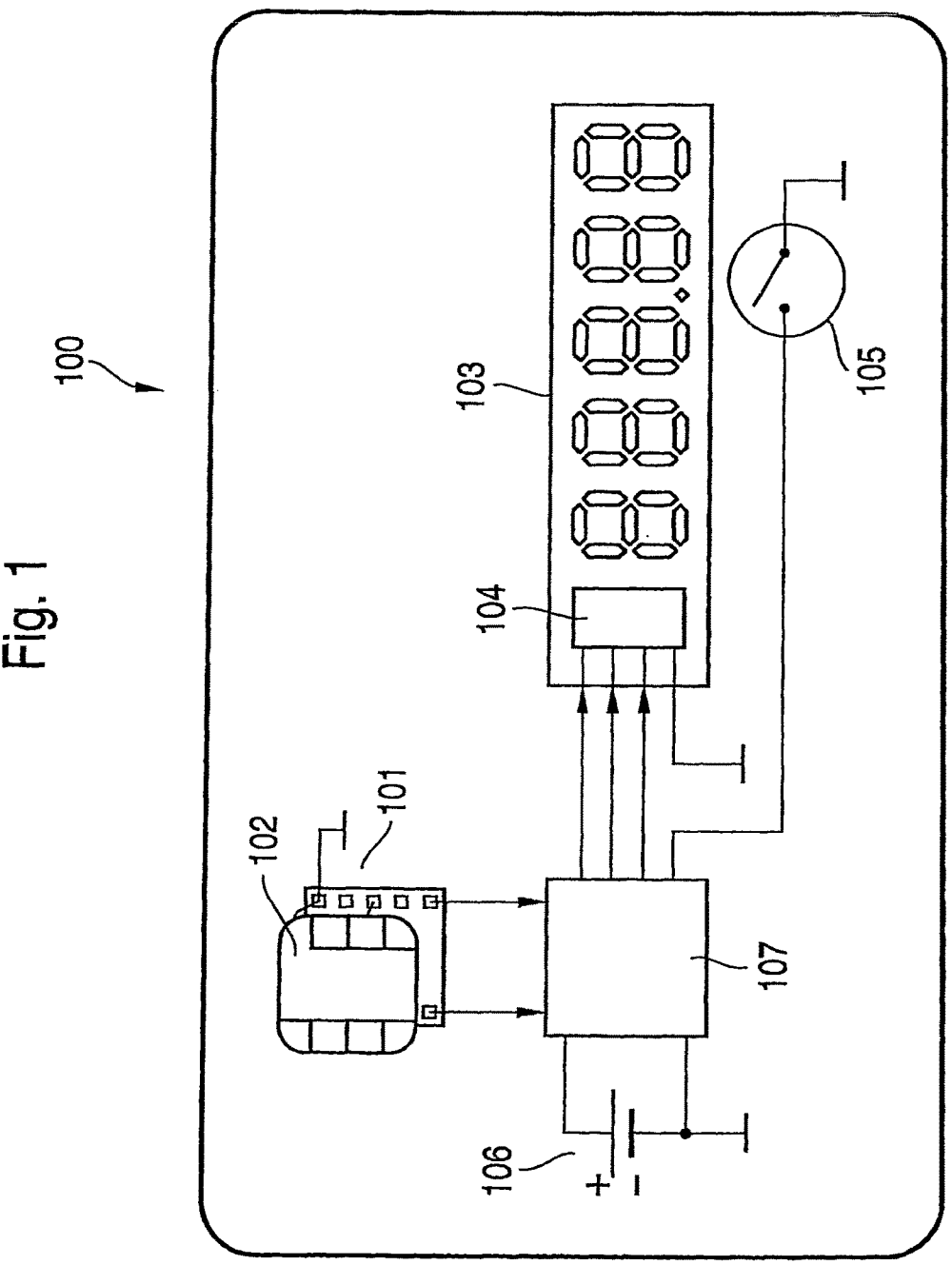
FIG. 1 shows a schematic representation of an electronic purse (cash card) having display.

FIG. 1 shows a schematic representation of electronic purse (cash card) 100 with display 103. Cash card 100 has a smart card controller, namely purse chip 101, on which an electronic credit balance is stored, contacts 102 for the contact-type contacting of purse chip 101, and via which purse chip 101 is supplied with energy, display 103, display control logic 104 (system controller) for actuating display 103, an energy operating element in the form of touch contact switch 105, an energy source in the form of battery 106, and a switching device in the form of system controller module 107 for switching energy flow and data flow between the individual elements within the electronic purse 100. The display control logic 104 preferably is integrated in display 103, but can also be provided separately.

FIG. 2 shows a schematic representation of a data carrier according to the invention designed as Eurocheque card 200 with cash card function having a device for generating one-time passwords and having a display 203 for displaying a generated one-time password.

The Eurocheque card 200 of FIG. 2 has a smart card controller 208. In the smart card controller 208 is implemented the function of a purse chip of an electronic purse (cash card function). Accordingly, the Eurocheque card has contacts 202 for the contact-type contacting between the Eurocheque card 200 and an external reading device or terminal, in order to perform communication processes usual for an electronic purse between the Eurocheque card 200 and the reading device or terminal. The Eurocheque card is associated to a personal account, namely a bank account (e.g. current account) at a credit institution.

In addition to the functionalities usual for electronic purses (cash cards), in the smart card controller 208 is implemented a TAN generator 201, with which one-time passwords in the form of transaction numbers (TANs) can be generated for secure electronic payment transactions.

Electronic (payment) transactions mean, for example, credit transfers, orders for papers of value, placing, cancellation and alteration of standing orders and savings plans, orders regarding the keeping of a personal account such as e.g. applications for exemption from taxation of income from capital or address changes, and the like.

The Eurocheque card 200 of FIG. 2 further has: volatile display memory 209 for storing a generated transaction number (TAN), display 203 for displaying the transaction numbers (TANs) generated by the TAN generator 201 and stored in the display memory 209, display control logic 204 (display driver) for actuating display 203, an energy operating element in the form of touch contact switch 205, an energy source in the form of two batteries 206 connected in series, and a switching device in the form of system controller module 207 for switching energy flow and data flow between the individual elements within the Eurocheque card 200. The two batteries 206 jointly supply the voltage required for driving the smart card. This voltage at present normally amounts to 5V+/−10%, so that for example two batteries each of 2.7 V are used. Optionally, more or less than two batteries are provided, by which altogether the required voltage can be provided.

Display memory 209 in terms of function can be connected with the switching device having the form of a system controller module 207 and with display control logic 204 (system controller), and preferably is integrated in switching device 207 or, alternatively, in display control logic 204.

Display control logic (display driver) 204, optionally, is integrated in display 203 or is provided separately from the display 203.

The smart card controller 208 with the TAN generator 201, the switching device in the form of system controller module 207, display memory 209 and display control logic 204, optionally, are implemented on separate chips or all or a part of them are implemented on one and the same chip.

With the Eurocheque card 200 a TAN can be generated and displayed on display 203, for example as follows:

A user actuates the touch contact switch (function key) 205, i.e. he presses and releases it and in this way triggers the generation of a TAN.

Upon the actuation of the touch contact switch (function key) 205 the switching device (system controller module 207) supplies a timing signal CLK and an operating voltage Vcc to smart card controller 208. For the following operation of the TAN generator 201 the operating voltage Vcc is supplied by the batteries 206. As soon as the timing signal CLK and the operating voltage Vcc are available at the smart card controller 208, the switching device (system controller module 207) transmits via a first data line 1/O1 a TAN generation command to smart card controller 208, more specific to TAN generator 201, with which TAN generator 201 is prompted to generate a (new) TAN. (Alternatively, the TAN generation command is sent via the second data line I/O2 or via the third data line 1/O3). The TAN is generated e.g. as a cryptogram according to a per se known method, with a parameterized encryption function, a key and a plaintext to be encrypted. The generated TAN is transmitted by the TAN generator 201 via a second and third data line I/O2, I/O3 (or a data line the TAN generation command was not transmitted with) to the switching device (to system controller module 207) and stored in the display memory 209. Now the timing signal CLK and the operating voltage Vcc (or only the operating voltage Vcc) supplied to the smart card controller 208 are interrupted. Instead a timing signal CLK' suitable for the display control logic 204 (display driver) and the operating voltage Vcc are presented to the display control logic 204 (display driver). The timing signal CLK' for display control logic 204 (display driver) normally has, in order to save energy, a lower frequency than the timing signal CLK for smart card controller 208. With alternative displays, which do not need a timing signal, now the supply voltage is presented to the display. Batteries 206 now have to supply energy only to the economical switching device (system controller module 207) and the economical display control logic 204. As soon as the timing signal CLK' (optionally for displays not needing clock pulse) and the operating voltage Vcc are available at display control logic 204, the switching device (system controller module 207) transmits via a fourth data line I/O DATA the transaction number TAN stored in display memory 209 to display 203. The TAN is displayed on the display 203 and remains displayed for three seconds. After three seconds the connections of the timing signal CLK and operating voltage Vcc (or only the operating voltage Vcc) to the display control logic 204 are interrupted. The representation on display 203 then fades away.

According to FIG. 2 four data lines I/O extend between system controller module 207 and the display control logic (display driver). Alternatively, a greater or smaller number of data lines I/O can be provided.

The display duration does not have to be three seconds, but can also be a different reasonable value, for example, four or five seconds.

The following exemplary operation possibilities for data carriers according to the invention having only one single touch contact switch (function key) 205 are provided.

For example, the TAN generation is triggered by a long actuation (e.g. pressing) (e.g. more than two seconds) of touch contact switch 205. A short actuation (e.g. pressing) of the touch contact switch 205 effects that the credit balance in the purse chip of the Eurocheque card is temporarily displayed on display 203, for example for two seconds. Alternatively, a short actuation triggers the TAN generation and the display of the TAN, and a long actuation triggers the display of the credit balance of the purse chip. Alternatively, another similar operating mode is used, such as known e.g. for small digital devices having a display such as e.g. digital clocks, digital thermometers and digital bicycle computers.

Alternatively, the display of the purse credit balance is triggered by pressing the touch contact switch 205 once, and the generation and display of a TAN is triggered by pressing the touch contact switch 205 twice (e.g. a double click such as known from the computer mouse) (or vice versa).

Data carriers according to the invention having two keys as an energy operating element can be operated, for example, such that with a first key the generation and display of a TAN is triggered and with a second key the display of the purse credit balance in the purse chip of the electronic purse (cash card) is triggered.

With embodiments of the invention that require that an access identification key (e.g. PIN) is entered before generating a one-time password, the data carrier has, for inputting the access identification key, for example a ten-key keyboard with keys for pressing the digits 0 to 9 as an access operating unit. Optionally, one or a plurality of further keys are provided, with which the generation and display of a one-time password can be triggered. Alternatively, one or a plurality of the keys for inputting the access identification key (e.g. PIN) are also used for triggering the generation and display of the one-time password (e.g. TAN), i.e. the ten-key keyboard serves as a universal operating unit. For entering the access identification key, optionally, less than ten keys can be provided, with which the digits 0 to 9 can be entered by suitably chosen shortcuts, as similarly known for e.g. adjusting small digital devices with display such as e.g. digital clocks, digital thermometers and digital bicycle computers. For example, with a first key a place to be adjusted of a multi-digit access identification key is chosen and with a second key the value for the chosen place is adjusted by actuating the second key so often that a value 0 to 9 is adjusted (e.g., "counting up" or, "counting down").

The display is, for example, a liquid crystal display, electronic paper or other display suitable for a data carrier.

The display further has, for example, a predetermined number of places, which are formed e.g. by multi segment displays or by dot matrix displays.

Optionally, the display has the same number of places as a generated one-time password to be displayed or has a greater number of places than a one-time password to be displayed, so that a generated one-time password can be displayed as a whole on the display. Alternatively, the display has less places than a one-time password to be displayed. Then the one-time password is displayed, for example, as a line continuously running over the display. Alternatively, the one-time password is split in two or more parts, which one after the other are displayed on the display, optionally with or without overlap between the parts of the one-time password.

For example, the display has, dependent on the length of the transaction numbers (TANs) used at present for secure payment transactions with credit institutions, six places (or more places for TANs that will be longer in the future), all places of a generated one-time password (in particular TAN) being displayed on the display at once. Alternatively, the display has five places. In order to display a six-digit one-time password on the five-digit display at first the first five digits and subsequently the last five places are displayed on the display (display mode with overlap, i.e. the digits in the middle are displayed twice). Alternatively, on the five-digit display at first the first three and subsequently the last three places of the six-digit one-time password are displayed (display mode without overlap, i.e. each digit of the one-time password is displayed only one time).

The invention claimed is:

1. A data carrier comprising:
   a card body;
   a device located on the card body;
   an actuating display for displaying generated one-time passwords located on a surface of the card body;
   display control means that actuates the actuating display, wherein the device is connected by at least one data line to one of the actuating display and the display control means, and wherein the device only operates during generation of the one-time passwords, and the display control means is electrically connected to a display memory that stores the one-time passwords received from the device to which the display memory is electrically connected;
   a hardware switching device located on the card body that selectively electrically connects the device and the display control means to an energy source by:

connecting the energy source to the device to provide power to generate a one-time password, disconnecting the energy source from the device immediately after the one-time password has been generated and saved, and connecting the energy source to the display control means to provide power for displaying the generated one-time password on the actuating display; and wherein the hardware switching device is a system controller module.

2. The data carrier according to claim 1, wherein the generated one-time password is a transaction number (TAN).

3. The data carrier according to claim 1, wherein the data carrier is a payment transaction card.

4. The data carrier according to claim 1, wherein the data carrier is an electronic purse.

5. The data carrier according to claim 4, wherein the actuating display is configured to display pieces of information of the electronic purse.

6. The data carrier according to claim 1, wherein the display control means has a lower power consumption than the device.

7. The data carrier according to claim 1, wherein the display memory being electrically connected between the device and the display control means, and the display control means for retrieval of the generated one-time password directly from the display memory to be displayed on the display.

8. The data carrier according to claim 7, wherein the display memory is a volatile memory arranged in a retention mode, during which a memory content of the display memory is arranged under low power supply.

9. The data carrier according to claim 8, wherein the hold time is at least one second.

10. The data carrier according to claim 7, wherein the display memory is a volatile memory arranged to be operated in a retention mode, during which a memory content of the display memory is arranged to be held under low power supply.

11. The data carrier according to claim 7, wherein the display memory is a non-volatile memory.

12. The data carrier according to claim 1, further comprising a display memory for holding generated one-time passwords for display, the display memory being electrically connected between the device and the display control means, the one-time password stored in the display memory, and the display control means for retrieval of the generated one-time password directly from the display memory to be displayed on the display after interruption of the energy to the device.

13. The data carrier according to claim 1, comprising: an access check device, for generating a one-time password only upon successful entry of a predetermined access identification key.

14. The data carrier according to claim 1, comprising: an access check device, which permits the operation of the data carrier for generating a one-time password only upon successful entry of a predetermined access identification key.

15. The data carrier according to claim 14, comprising: an access operating unit for operating the access check device.

16. The data carrier according to claim 13, comprising: an access operating unit, wherein an energy operating unit and the access operating unit are formed by a common universal operating element.

17. The data carrier according to claim 1, comprising: a biometric detection device for detecting biometric data.

18. The data carrier according to claim 17, wherein the biometric detection device is at least one of a finger print sensor and a camera.

19. The data carrier according to claim 1, comprising a manually actuated energy operating unit for operating the switching device.

20. The data carrier according to claim 1, wherein the switching device disconnects the energy source from the display control means after the one-time password has been displayed for a predetermined amount of time.

* * * * *